L. E. BAKER.
FLOAT REGISTER.
APPLICATION FILED NOV. 24, 1919.

1,393,069.  Patented Oct. 11, 1921.
3 SHEETS—SHEET 2.

INVENTOR.
Linnaeus E. Baker
BY Walter A. Knight
ATTORNEYS.

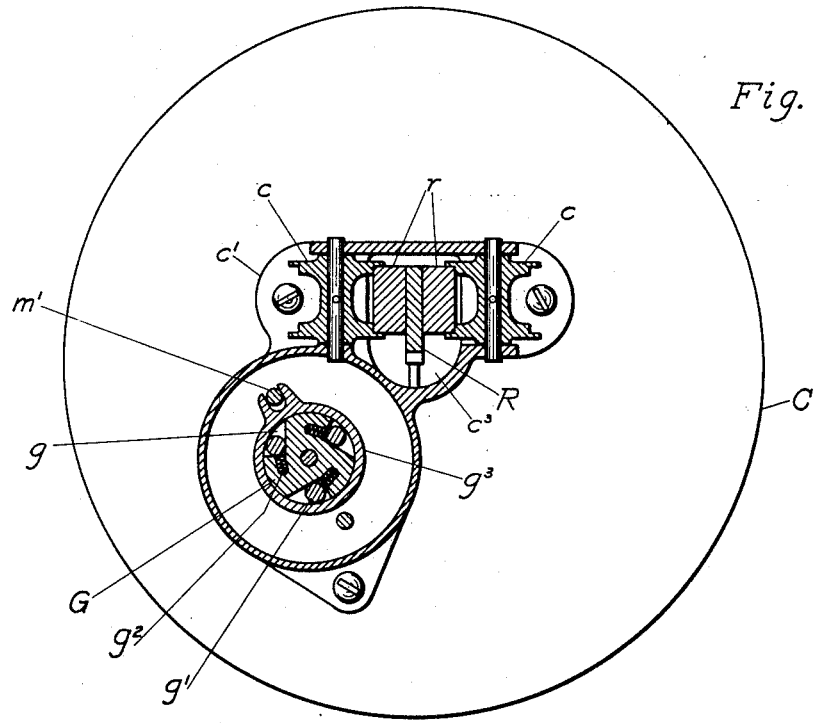
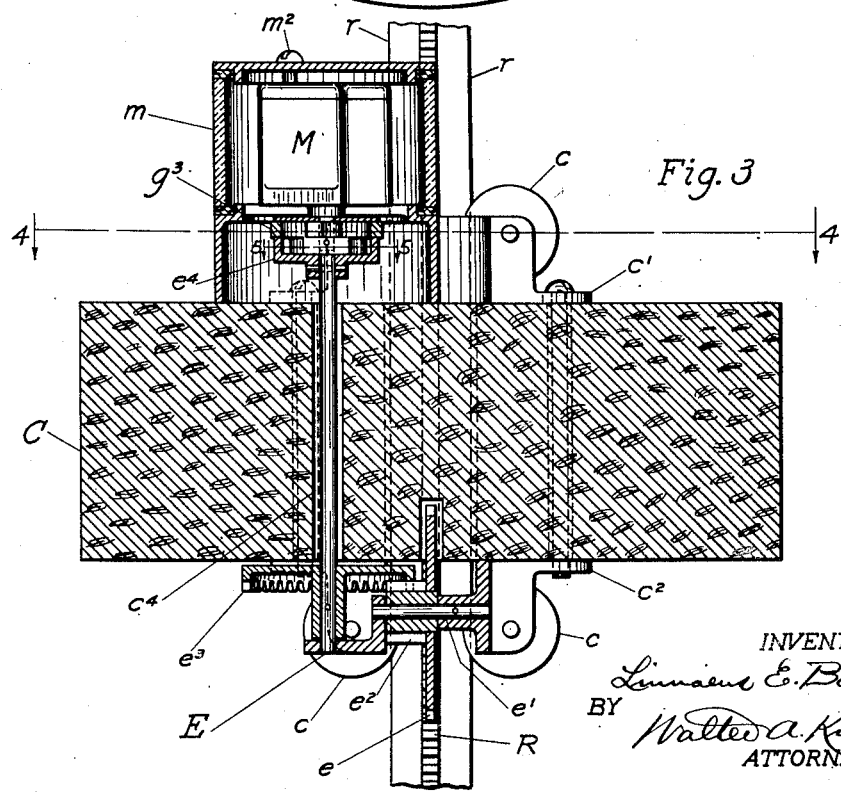

UNITED STATES PATENT OFFICE.

LINNAEUS E. BAKER, OF FORT WAYNE, INDIANA, ASSIGNOR TO WAYNE OIL TANK AND PUMP COMPANY, OF FORT WAYNE, INDIANA, A CORPORATION OF INDIANA.

FLOAT-REGISTER.

1,393,069.     Specification of Letters Patent.     Patented Oct. 11, 1921.

Application filed November 24, 1919. Serial No. 340,342.

*To all whom it may concern:*

Be it known that I, LINNAEUS E. BAKER, a citizen of the United States, residing at Fort Wayne, in the county of Allen and State of Indiana, have invented new and useful Improvements in Float-Registers, of which the following is a specification.

My invention relates to the class of containing vessels for liquids, designed and constructed to hold specific quantities varying according to the relative height of the liquid column remaining after given quantities are drawn off. Such containers have come very largely into use for the casual supply of oil or spirit to power-driven vehicles and the conditions of use require great exactness in the measurement of quantities of liquid delivered, which is difficult to accomplish except by mechanism eliminating or minimizing the human element, because roadside deliveries (for example) are frequently required to be made in haste or under adverse conditions unfavorable to exact measurements. My invention seeks to improve the usefulness of the device by embodying new features of structure, producing positive and exact quantitative delivery, associated with a simple means of indicating visually the amount of the particular delivery and the exact remainder of liquid in the container.

My invention is illustrated in the accompanying drawings, in which—

Figure 1:
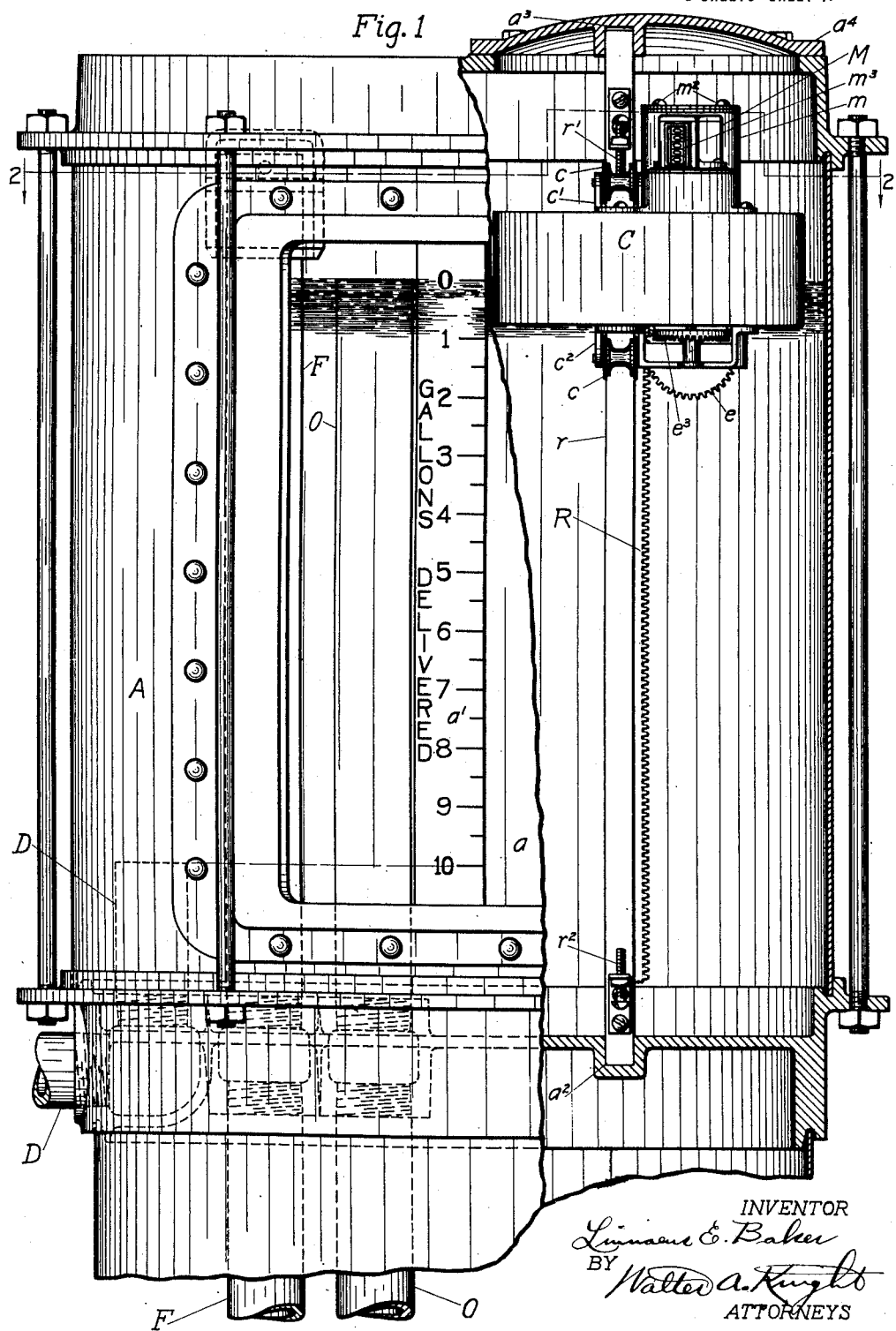
Figure 2:
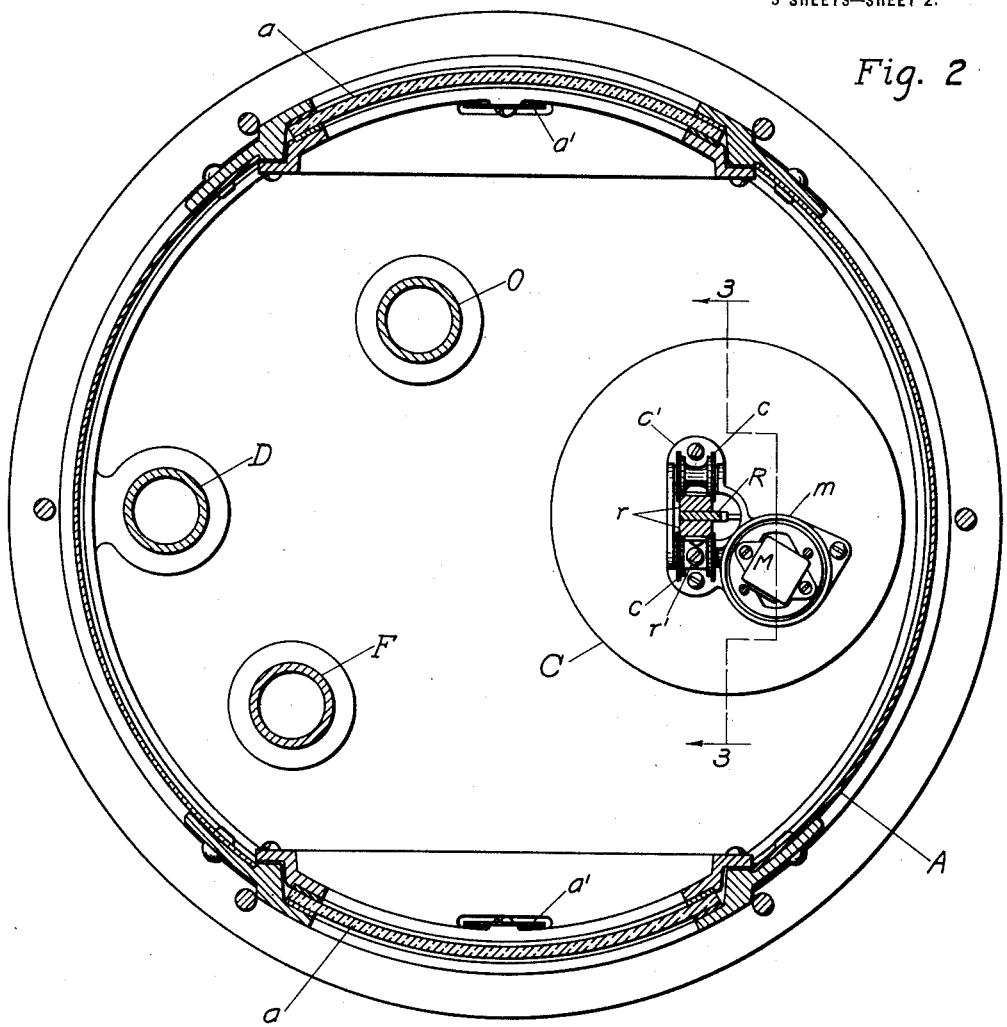
Figure 5:
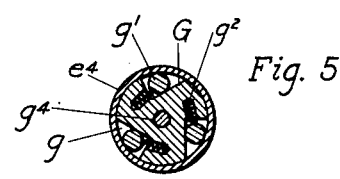
Figure 6:
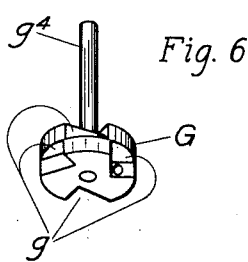

Figure 1, is an elevation of the elevated liquid container of a so-called visible dispensing apparatus for gasolene, with parts broken away and in section exposing to view the float register mechanism in operative position within, with the container filled, Fig. 2, is a cross section of the same on the line 2—2 of Fig. 1, as though the apparatus was shown in full, in Fig. 1, Fig. 3, is an enlarged vertical section through the float and parts of the register on the line 3—3 of Fig. 2, Fig. 4, is an enlarged cross section through the register on the line 4-4 of Fig. 3, as though the apparatus was shown in full in Fig. 3, Fig. 5, a detail, is a cross section on the line 5—5 of Fig. 3, as though the register was there shown in full instead of in section, and Fig. 6, a detail, is a perspective of the ratchet core which drives the counting mechanism.

Referring now to the drawings, A is a liquid container of uniform cross-area throughout its height, with fill pipe F, overflow pipe O, and discharge pipe D, shown in dotted lines within. The container has windows $a$, and scales $a^1$, graduated to gallons and half gallons so that the quantity of liquid delivered can be readily observed by changes in the surface height of the liquid remaining, as indicated by the float in relation to a fixed vertical scale $a^1$ adjacent to said float.

The container has a recess $a^2$, in its bottom and another $a^3$, on the underside of the handhole cover $a^4$, to receive and hold securely in position the guide bars $r$, and the rack R secured between them.

A float C, made of cork, hollow metal, or other buoyant material preferably in the form of a shallow cylinder of relatively liberal dimensions is adapted to float upon the surface of the liquid in the container and is provided with two tubular openings $c^3$ and $c^4$ extended vertically through and between the upper and lower walls of the float, with ample clearance, in $c^3$ for the guide bars $r$, and rack bar R, and in $c^4$ for a drive shaft E, as hereinafter explained. The register mechanism hereinafter to be described is mounted upon the upper side of said float.

To this end there is provided a pair of guide rollers in corresponding relations of practically frictionless rolling contact with the fixed guide bars at opposite sides, and pivotally mounted upon brackets $c^1$ $c^2$ secured upon the upper and lower sides of the float in corresponding relation to the guide bars and to the tubular opening $c^3$. These rollers have outer radial flanges to engage upon the outer sides of the guide bars to hold the float at all times in proper relation thereto.

At the underside of the float and coincident with the tubular opening $c^3$ referred to, and journaled in suitable brackets across the front of the rack bar R, is arranged an enlarged spur gear $e$, in permanent mesh with the rack bar and operated by the vertical movements of the float $c^1$ and adjacent to said spur gear as a "hub" of same is a spur pinion $e^2$.

The spur pinion is in constant mesh above with a crown gear $e^3$ seated upon a vertical drive shaft E sustained at its lower end in a socket projection upon the lower face of the float, and passing upward by a tubular opening $c^4$ through the float without contact therewith. A segmental projection upward of the spur pinion within the body of the float, is provided for by a leak-tight covering at the inner side of the bottom of the float.

It will be seen that the vertical movements of the float in relation to the stationary rack R, causes corresponding rotations of the drive shaft E.

On the upper end of the drive shaft E, is fixed a ratchet cup $e^4$, into which extends the lower half of a double ratchet core G, which is fixed to the lower end of the shaft $g^4$, which operates the counting mechanism M. This counting mechanism may be of any usual type with figures showing at the window $m^3$, and is supported upon and fixed to the top plate $c^1$, inclosed in a transparent case $m$.

The ratchet consists of a double ratchet core G, with pockets $g$, in each of which is a clutch roll $g^1$, pressed into engagement position by a coiled spring $g^2$.

There is a complete clutch ratchet consisting of the lower half of the core G, with its pockets, rolls and springs and the ratchet cup $e^4$, and another consisting of the upper half of the ratchet core G, with its pockets, rolls and springs and a holding clutch ring $g^3$. This ring is held against rotation by a pin $m^1$, which is the lower end of the screw $m^2$, that secures the case $m$, to the top plate $c^1$.

The ratchet mechanism is so arranged that the lower ratchet clutch drives the shaft $g^4$, in a forward direction when the float is falling and the upper ratchet clutch prevents backward rotation of the shaft $g^4$, when the float is rising. Any clutch mechanism that will accomplish this purpose is within the scope of my invention.

The mechanism should preferably be so placed upon the float as to balance.

Adjustable stops $r^1$, $r^2$, limit the upward and downward motions respectively, of the float and its register mechanism to agree with the scale.

The operation of the register is as follows:—The container A, is filled through the fill-pipe F, with the liquid to be measured and the float rises to its extreme high position as limited by the adjustable stop $r^1$, that is to zero on the scale. During this filling process the rack gear $e$, causes backward rotation of the drive shaft E, but this causes no backward rotation of the counting mechanism as heretofore explained. Any excess liquid is drained off through the overflow pipe O, until the liquid in the container stands at zero on the scale.

The liquid is drawn off through the discharge pipe D, causing the liquid to fall in the container A, and the float and its attendant register mechanism to fall with it. The rack gear $e$, being in constant engagement with the fixed rack R, is caused to rotate by any vertical movement of the float. Downward movement of the float rotates the drive shift E, in a forward direction, and through the ratchet clutch rotates the counting mechanism forward, but an upward movement of the float, disconnects the counting mechanism M from the drive shaft E and it therefore remains unaffected by the rotation of said shaft caused by such movement. The units on the counting mechanism are made to conform to the units on the scale, so that each gallon or other units of liquid delivered is indicated on the counter. It will be seen that with the relatively large and heavy float, a relatively large spur gear in mesh with the fixed rack and operating a small spur gear to drive a crown gear in a gear train without lost motion, constantly immersed in a lubricating liquid, the combination presents delivery and recording devices capable of operation under all conditions with an exactness and despatch not otherwise attainable.

I claim as my invention and desire to secure by Letters Patent of the United States:—

1. A device of the class described comprising a container, a float adapted to rest by its buoyancy at all times on the surface of the contained liquid and move vertically therewith; fixed vertical guides secured within the container; guide wheels upon the float in rolling contact with said fixed guides; and counting mechanism operated by and registering the vertical movements of the float.

2. A liquid delivery device of the character indicated comprising a container provided with a stationary rack-bar and guide rails secured vertically between the top and bottom walls of the container casing; a float adapted to rest upon the body of contained liquid and to move in accordance with changes in the vertical level thereof; guide rolls upon said float adapted to ride upon the fixed guide rails and maintain the relative position of the float; a spur gear carried upon the float in constant operative relation with the rack-bar; and means connected therewith for operating a counting device.

3. In a liquid delivery device of the character indicated, a vertical container of equal cross-areas; a relatively large float having tubular vertical passages through the same; a vertical rack-bar secured to the top and bottom of the container and passing through said tubular opening without contact; a fixed guide rail similarly secured to the container walls and passing through the said—or a similar—tubular opening in the float; guide wheels secured to the float in rolling contact with said guide rail; a gear train mechanism secured to the underside of the float and operated by the gear contact with the rackbar; a shaft driven thereby, extending upward through the float, and counting mechanism upon the upper surface of the float in connective operation with said drive shaft.

In testimony whereof I have hereunto set my hand in presence of two subscribing witnesses.

LINNAEUS E. BAKER.

Witnesses:
　LAWRENCE H. PARROT,
　GEORGE B. DUNHAM.